(12) United States Patent
McDermott

(10) Patent No.: US 6,206,628 B1
(45) Date of Patent: *Mar. 27, 2001

(54) PALLET JACK ADAPTER

(75) Inventor: Daniel J. McDermott, Wayne, NJ (US)

(73) Assignee: Lumper Industries, Inc., Wayne, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,739

(22) Filed: Jul. 3, 1997

(51) Int. Cl.⁷ .................................................. B66F 11/00
(52) U.S. Cl. ........................................... 414/607; 414/785
(58) Field of Search ................................... 414/607, 785, 414/608, 663; 187/237

(56) References Cited

U.S. PATENT DOCUMENTS

| | | | |
|---|---|---|---|
| 3,105,604 | * 10/1963 | Quayle | 414/607 |
| 3,223,259 | * 12/1965 | Nicholson | 414/608 X |
| 3,414,087 | * 12/1968 | Schmiesing | 187/237 X |
| 3,791,544 | * 2/1974 | Moses | 414/785 |
| 3,850,322 | * 11/1974 | Miles et al. | 414/607 |
| 4,027,771 | * 6/1977 | Adams | 414/785 X |
| 4,239,446 | 12/1980 | Vucinic | 414/785 |
| 4,290,729 | * 9/1981 | Cary | 414/607 |
| 4,402,644 | 9/1983 | Barchard | 414/417 |
| 4,403,903 | * 9/1983 | Cary | 414/607 |
| 4,482,286 | 11/1984 | Farmer et al. | 414/607 |
| 4,497,606 | * 2/1985 | Hobson | 414/785 X |
| 4,624,620 | 11/1986 | Farmer et al. | 414/607 |
| 4,708,575 | 11/1987 | Farmer et al. | 414/607 |
| 4,824,317 | * 4/1989 | Schroder | 414/785 X |
| 4,904,147 | * 2/1990 | Wasylyshyn | 414/608 |
| 5,139,385 | 8/1992 | Chase et al. | 414/667 |
| 5,201,631 | * 4/1993 | Ringot et al. | 414/802 |
| 5,257,895 | * 11/1993 | Vom Stein | 414/608 |
| 5,374,151 | * 12/1994 | Matthews | 414/392 |
| 5,385,103 | * 1/1995 | Juvik-Woods | 108/51.3 |
| 5,829,948 | * 11/1998 | Beckland | 414/785 X |
| 6,042,329 | * 3/2000 | Marquez et al. | 414/607 |

FOREIGN PATENT DOCUMENTS

2240085 * 7/1991 (GB) .................................... 414/607

* cited by examiner

Primary Examiner—James W. Keenan
(74) Attorney, Agent, or Firm—Hedman & Costigan, PC

(57) ABSTRACT

An adapter for use with a pallet jack or truck to permit an operator to load and unload pallets from the four-way side of a pallet.

6 Claims, 7 Drawing Sheets

PALLET JACK ADAPTER

The present invention relates to a pallet jack or truck adapter configured to enable the manipulation and movement of pallets from the four-way side of the pallet and a method for manufacturing the adapter.

BACKGROUND OF THE INVENTION

The use of forklifts and pallets for handling materials is well known. A typical fork-lift is a vehicle having at its front end a mast and hoist structure, at the lower end of which is a fork comprising a pair of horizontal, forwardly extending adjustable tines insertable beneath a load. The hoist is used to raise the load and the fork-lift truck carries the load to an unloading point. The tines can be tilted forward and back and are adjustable in width.

Pallet jacks are similar to fork-lift trucks in that they are used to handle palleted material. However, pallet jacks, which can be manual (i.e., can be raised and lowered using a manually operated hydraulic jack) or electric, are limited in that they are not as powerful as fork-lifts and generally do not have adjustable tines. Moreover, the tines of a pallet jack are generally wider than those of a fork lift to better distribute loads.

Pallets are used for receiving the load initially so as to permit the handling of heavy and bulky loads or to enable the stacking of several articles to comprise the load. Normally the load and pallet are shipped as a unit. A conventional pallet is a wooden structure made up of several parallel, horizontal stringers and several cross boards, all nailed together to form a rectangular element. In two-way pallets, the fork tines enter between the stringers and engage the cross boards from below. In a four-way pallet, the stringers are cut out in two areas each to provide inverted U-shaped openings in what is known as the "four-way" side spaced apart to receive the tines of a fork-lift. A fork-lift may enter selectively, from any of the four sides of the pallet, whereas in the two-way pallet entry can occur from only two opposite sides.

All conventional pallets are not exactly alike, but are dimensioned so as to accommodate most fork-lifts. The fork entry openings are made wide enough to accommodate different tine spacings as well as to enable easy entry without precise maneuvering of the fork-lift. Nevertheless, it is not possible for a pallet jack to unload or load a pallet from the four-way side of a pallet because the inverted U-shaped openings of the pallet are not wide enough to accept the width of a pallet jack fork.

In the past most trailers have been 96" wide. A standard GMA (Grocery Manufacture Association) pallet is 48" deep×40" wide. Given these dimensions it was difficult to put two pallets side by side with the 48" side facing the door opening. Therefore, much of the industry had been "pin wheeling" the pallets (turning one the 48" way and the other the 40" way) to fit them into the 96" wide trailer and to load the maximum amount of product into the trailer.

Now the trailer manufacturers are allowed to build the trailers 102" wide. This allows enough room for two 48" wide pallets to fit side by side very comfortably with a conventional fork-lift. By putting the 48" side facing the door and the 40" side of the pallet facing the walls of the trailer it allows the trailer to accept more pallets.

One problem arises when the only type of material handler for loading and unloading in the possession of many businesses is one or more pallet jacks. The present invention overcomes this problem by facilitating the unloading of pallets from the four-way side using only a pallet jack. Its design allows the operator to enter the inverted U-shaped openings of the pallet, raise the engaged side of the pallet a few inches off the ground and slide it out of the trailer.

The present invention also addresses the common problem that arises when the pallets are situated as described above and a fork-lift is available but the fork-lift can not be driven into a trailer, i.e., because of the weight of the fork-lift, or where the degree of angle between the loading dock and trailer is too steep to allow the entry of the entire fork into the two-way side of the pallet. The adapter is lightweight and can be quickly removed from the forks of the pallet jack.

Additionally, due to the increased number of pallets that can be loaded onto a trailer if they are turned with the 48" side facing the door there is considerable savings in transportation costs of all products. Moreover, the present invention eliminates the need for businesses to purchase a fork-lift to solve the problem of loading and unloading pallets from the four-way side.

OBJECTS OF THE INVENTION

It is therefore an object of the present invention to provide a structure that enables an ordinary pallet truck or jack to be adapted to manipulate and move pallets when the pallets are accessible only from the four-way side.

It is another object of the invention to provide a pallet jack adapter that is relatively lightweight, and is structurally sound.

It is yet another object of the invention to provide a pallet jack adapter that is adjustable and can be adapted to any available pallet truck or jack.

It is still another object of the invention to provide a process for the manufacture of the adapter of the present invention.

SUMMARY OF THE INVENTION

Accordingly, the present invention comprises an apparatus in the form of a pallet truck or jack adapter for maneuvering and moving pallets accessible only from the four-way side of the pallet and a process for forming the adapter.

The adapter comprises at least two substantially S-shaped engaging forks oriented substantially parallel to each other and at least one transverse member joining the two S-shaped forks. Each of the S-shaped forks comprises a first and second end. The first end of each S-shaped fork comprises an upturned engaging portion adapted to engage and subsequently lift a pallet from the four-way side of the pallet. The second end of each S-shaped fork comprises a downturned hooking engaging portion for engaging the respective load wheel cutouts located at the distal end of the forks or tines of a pallet truck or jack of known design. When the second end of each of the respective S-shaped portions of the adapter are engaged in the load wheel cutouts of the pallet jack, the transverse member of the adapter is seated perpendicularly to and bridges the gap between the forks or tines of the pallet jack. With the adapter in the engaged position the pallet jack is adapted to easily manipulate pallets from the normally inaccessible four-way side.

The method of manufacture of the adapter essentially involves forming at least two S-shaped sections of sheet steel by bending and heat treating the steel, and welding at least one transverse member of sheet steel to the S-shaped portions such that the S-shaped portions are maintained parallel to each other by the transverse member.

BRIEF DESCRIPTION OF THE DRAWINGS

Other objects and advantages of this invention may be seen from the following description when viewed in conjunction with the accompanying drawings wherein.

DESCRIPTION OF THE PREFERRED EMBODIMENT

Figure 1:
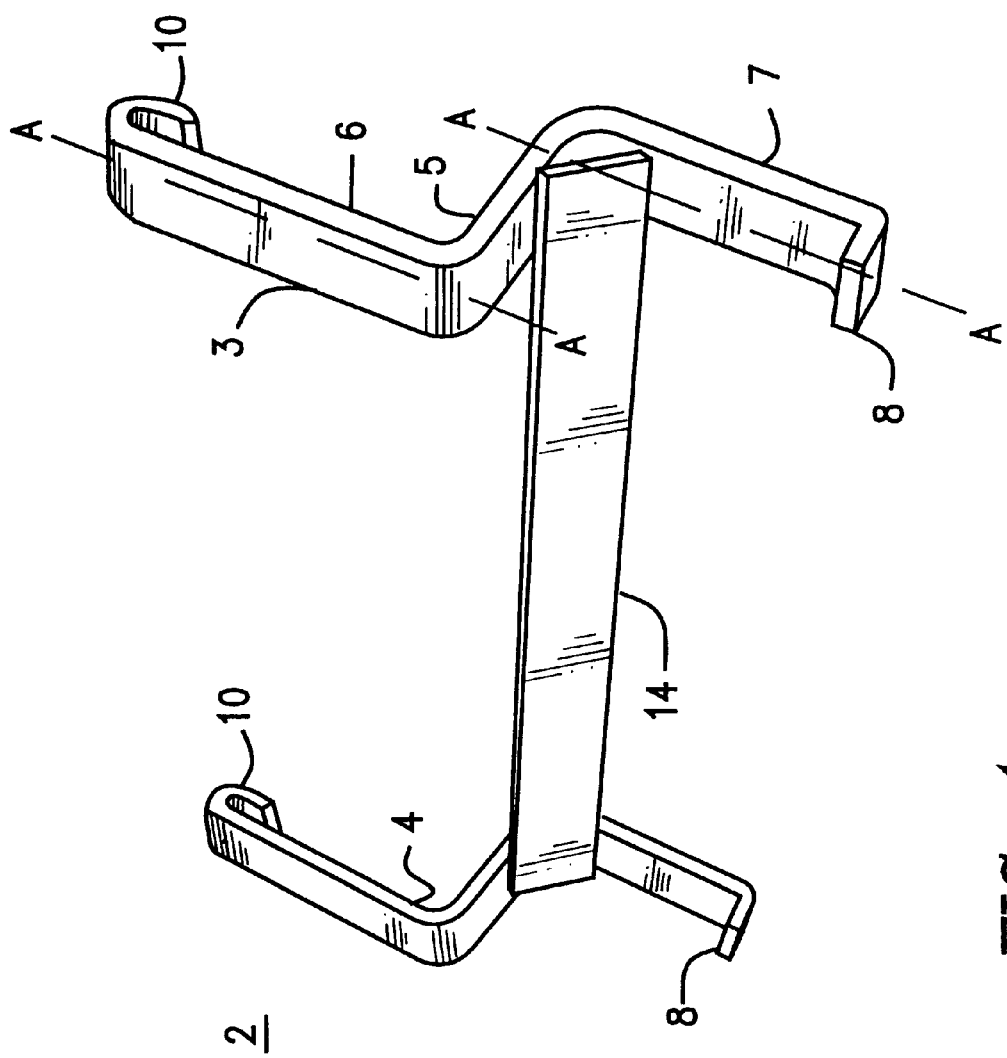
FIG. 1 is an isometric view of the adapter.

As best seen in FIGS. 1–4 and 6 an embodiment of the adapter 2 is comprised primarily of a first S-shaped portion 4, a second S-shaped portion 6 and transverse members 14 and 16 connecting first S-shaped portion 4 to second S-shaped portion 6.

Now referring to FIGS. 1–3, 6 and 7 S-shaped portions 4 and 6 further comprise an upper portion 3, a medial portion 5 continuous with and formed at an angle in the range of between about 85 to about 95 degrees, preferably about 90 degrees, with respect to said upper portion 3, a lower portion 7 continuous with and formed at an angle in the range of between about 85 to about 95 degrees, preferably about 90 degrees, with respect to said medial portion 5 and substantially parallel and offset with upper portion 3, said lower portion 5 further comprising an upturned flange portion 8 adapted to engage and subsequently lift a pallet 30 from the four-way side 32 of the pallet 30 via engagement with the inverted U-shapedn openings or notches 34 of the pallet 30, and said upper portion further comprising a downturned hook portion 10 for engaging the respective load wheel cutouts 24 located at the distal end of the forks or tines 20 of a pallet truck or jack of known design.

Figure 2:
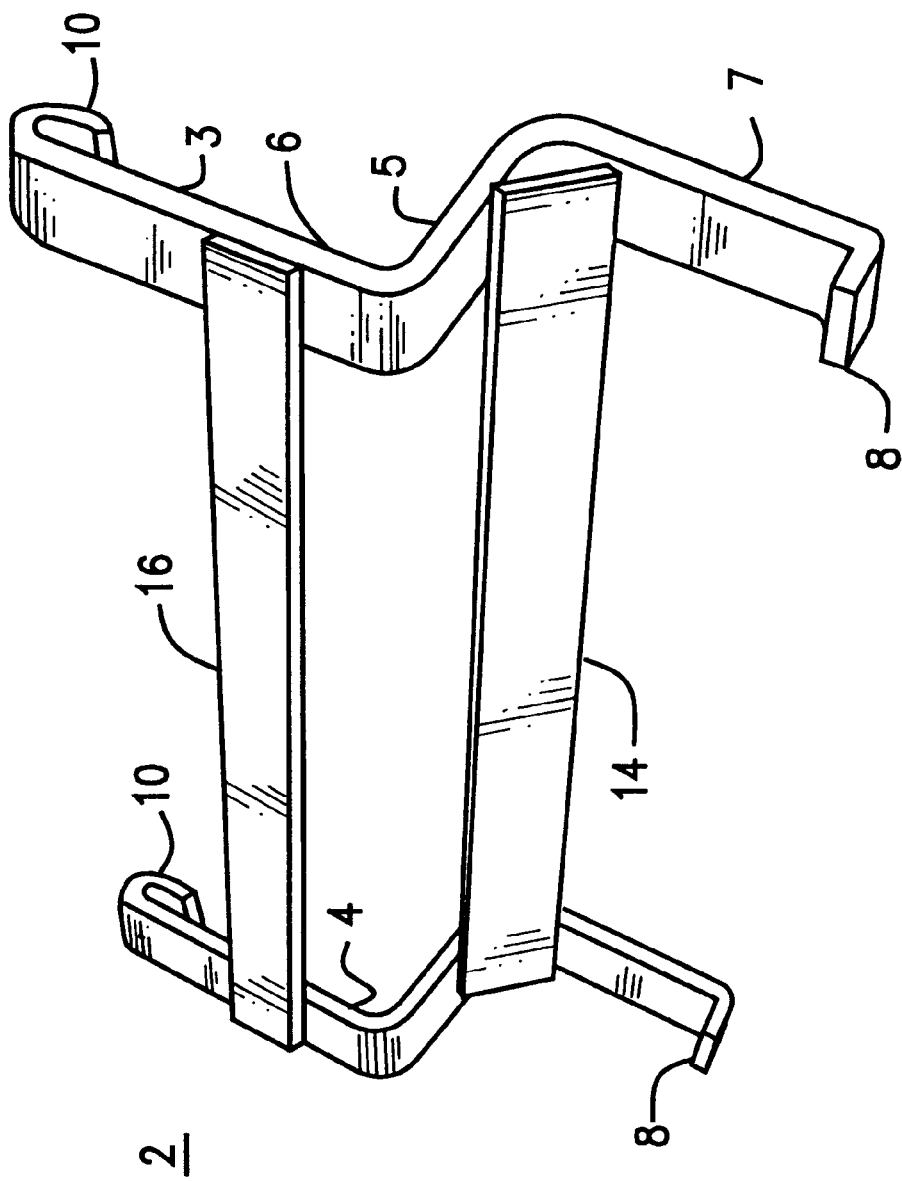
FIG. 2 is an isometric view of a preferred embodiment of the adapter having two transverse members.
Figure 3:
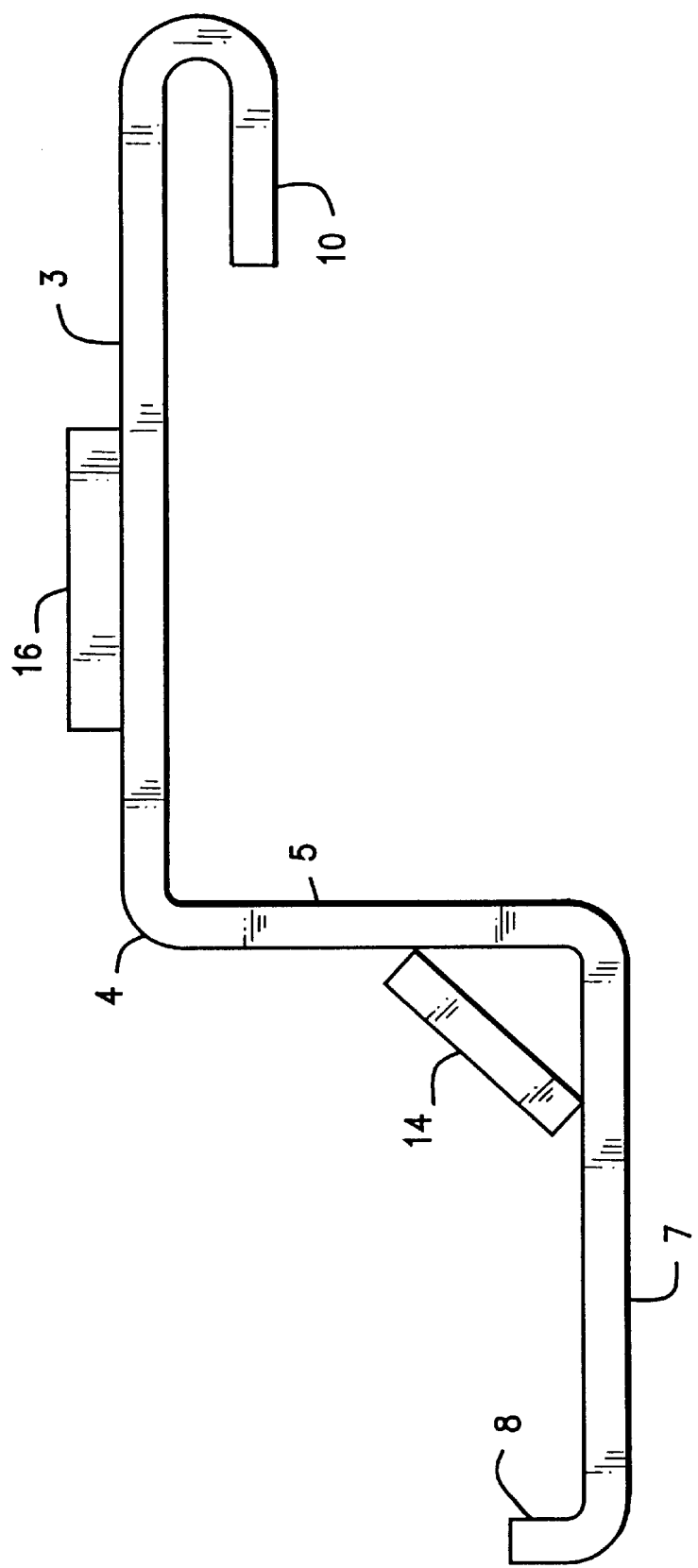
FIG. 3 is a side elevational view of the adapter taken along line A—A of FIG. 1.

Now referring to FIGS. 2 and 3 S-shaped portions 4 and 6 are oriented parallel to and in the same plane as each other and transverse members 14 and 16 are welded to the top surface of the S-shaped portions 4 and 6 to form the adapter 2 of the present invention.

Now referring specifically to FIG. 1 in a preferred embodiment the adapter 2 comprises only one transverse member 14. As best seen in FIG. 3, transverse member 14 is welded to said S-shaped portions 4 and 6 such that a top edge of said transverse member 14 is welded to medial portion 5 and a bottom edge of transverse member 14 is welded to lower portion 7 of the S-shaped portions 4 and 6, forming respective angles of between about 40 and 50 degrees and preferably about 45 degrees, between the top edge of transverse member 14 and medial portion 5 and between the bottom edge of transverse member 14 and lower portion 7.

As shown in FIG. 2, the adapter 2 may further comprise transverse member 16 to provide further structural support.

Figure 5:
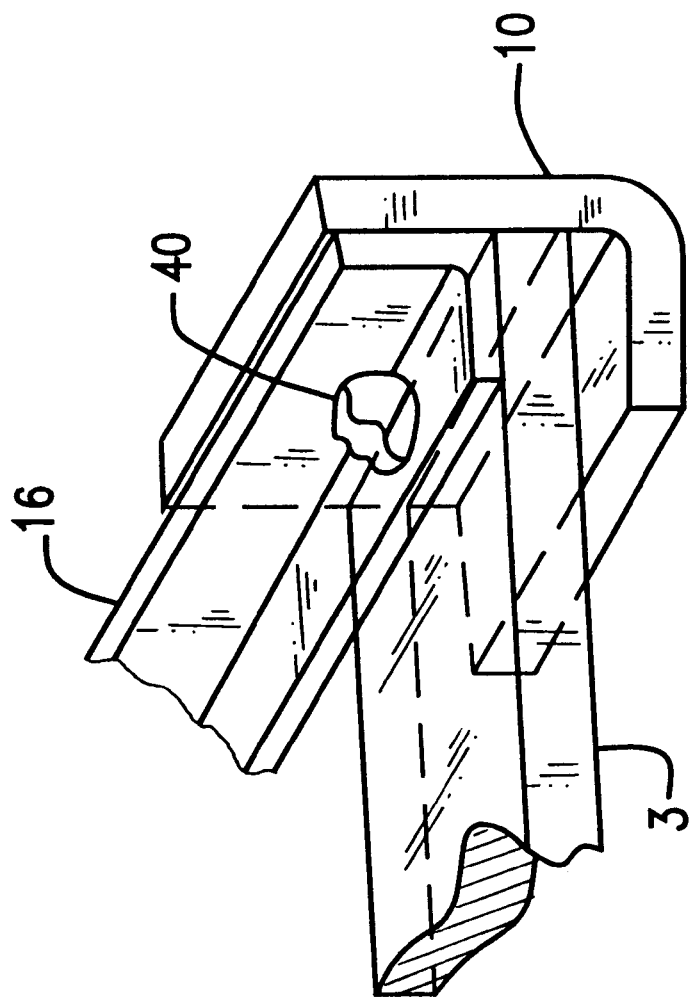
FIG. 5 is a side partial perspective view of one embodiment of the construction of the hook portion of the adapter.
Figure 6:
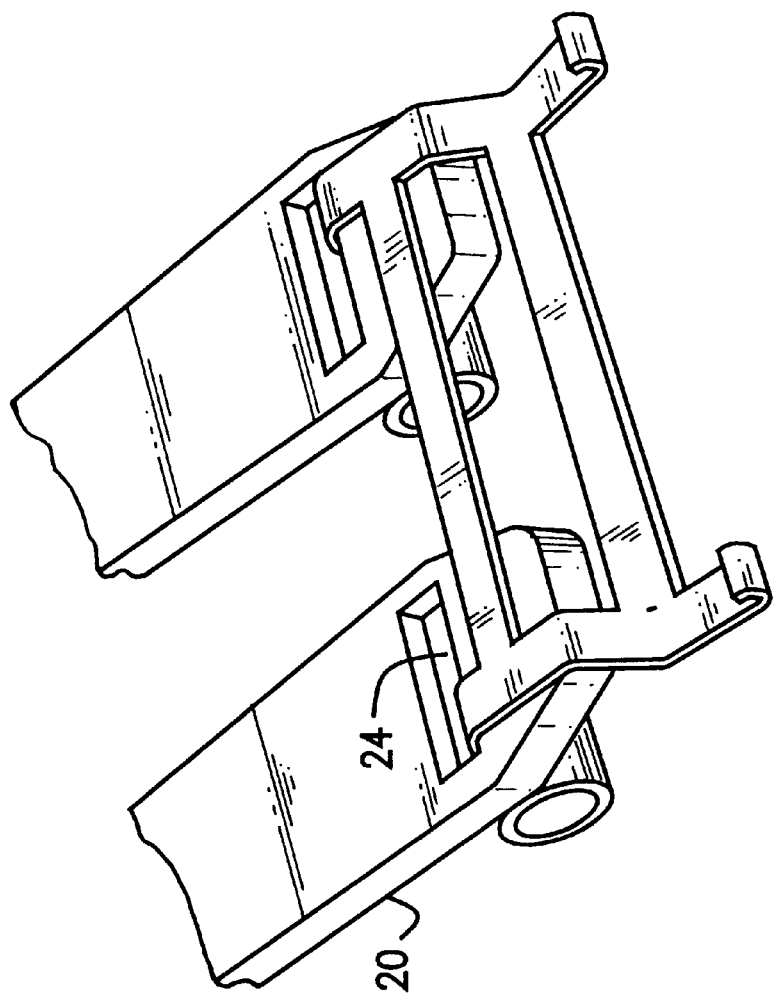
FIG. 6 is an isometric view of the adapter in the engaged position on the forks of a lift truck.
Figure 7:
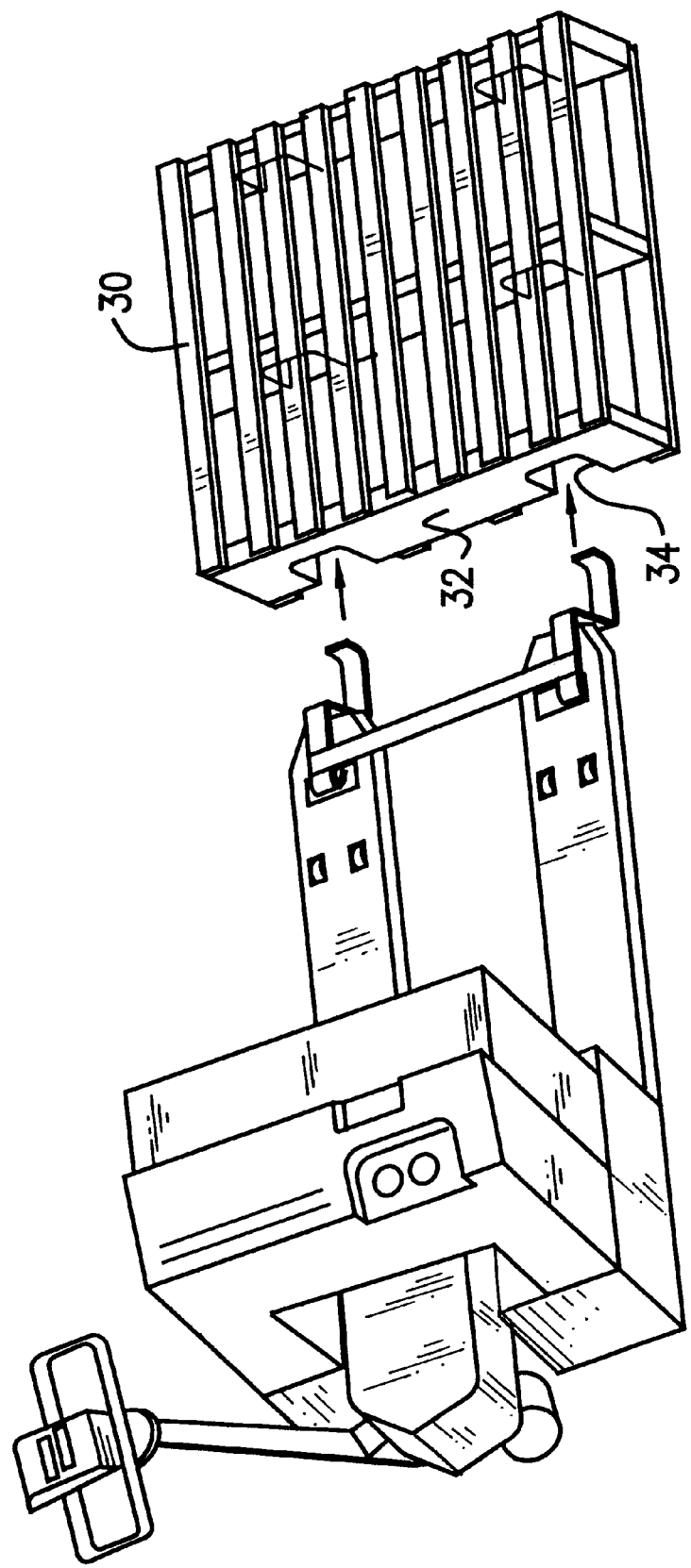
FIG. 7 is an isometric view of the adapter in the engaged position on the forks of a lift truck prior to and in proper alignment for engagement with the four-way side of a pallet.

Now referring to FIGS. 1–3 and 6, the hook portion 10 is continuous with and substantially parallel to the upper portion 3 of S-shaped portions 4 and 6. The hook portion 10 is between about 1 to about 2 inches in length and preferably about 1½ inches in length. The space formed between upper portion 3 and hook portion 10 can vary but preferably is between about ⅜ inches and ½ inch. Now referring to FIG. 5, in another embodiment the hook portion 10 is formed by an L-shaped bracket welded to the end of upper portion 3 of S-shaped portion 6 and further welded to transverse member 16, which for purposes of this embodiment is disposed at the end of the upper portion 3 to add structural integrity to the adapter 2 in the embodiment of FIG. 5. A hole 40 may be formed in the transverse member 16 to accommodate additional welding.

Figure 4:
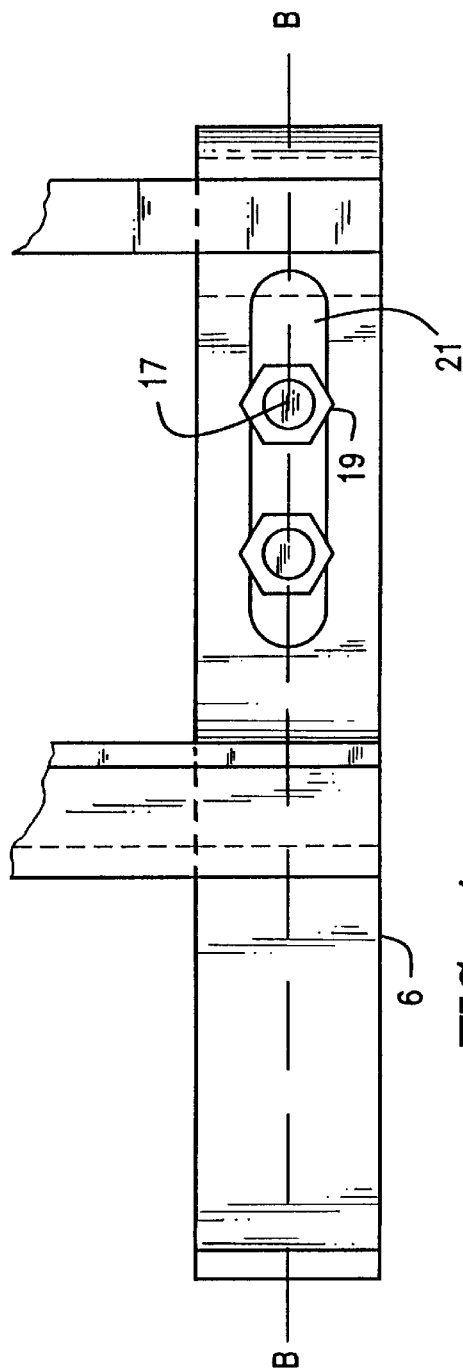
FIG. 4 is a top plan view of a preferred embodiment of the adapter wherein the hook portion of the adapter is adjustable.
Figure 4A:
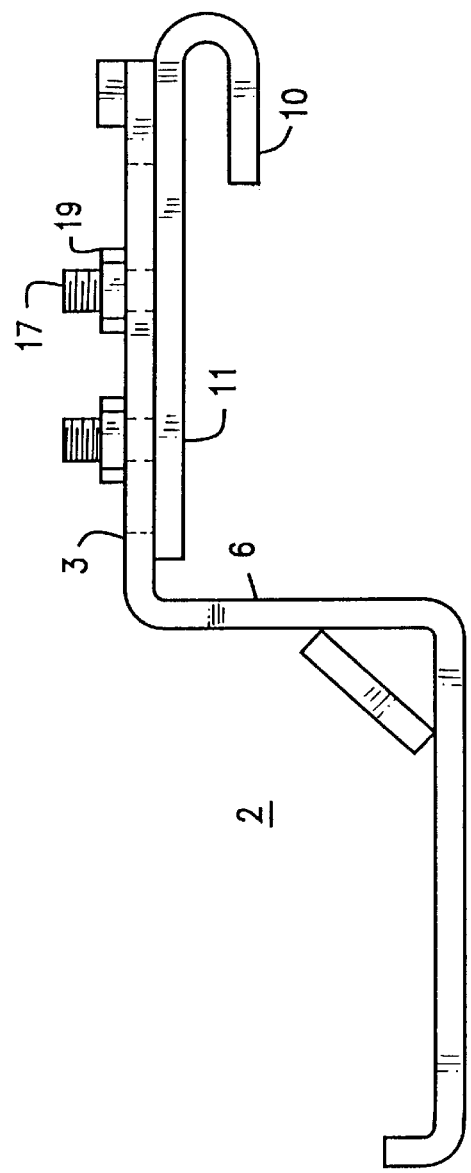
FIG. 4A is a side elevational view of the adapter taken along line B—B of FIG. 4.

Now referring to FIGS. 4 and 4A, in a preferred embodiment S-shaped portions 4 and 6 of adapter 2 each comprise an adjustable hook 10 wherein the hook portion 10 further comprises an elongated portion 11 slidably and adjustably engaged with upper portion 3. Elongated portion 11 further comprises at least one upwardly depending bolt means 17. Upper portion 3 further comprises an opening 21 for slidably receiving bolt means 17. A nut 19 threadably engages bolt means 17 for adjustably securing the elongated portion 11 of hook 10 to upper portion 3.

Now referring to FIGS. 1–3 and 7, flange 8 is between about ¾ inch to 1½ inches in length and preferably about 1 inch in length but in any case must be sufficiently dimensioned to engage the U-shaped opening or notch 34 of the four-way side 32 of a pallet. The angle formed between the flange 8 and the lower portion 7 is between about 75 degrees and 95 degrees and preferably about 90 degrees.

Now referring to FIGS. 1–7 S-shaped portions 4 and 6 and transverse members 14 and 16 are formed of sheet steel or any other suitable high tensile strength material. The present adapter has been found to perform well when formed from stainless steel such as 304 SS. S-shaped portions 4 and 6 are substantially identical in dimension but can vary in size depending on the pallet jack to which the adapter will be engaged. In a preferred embodiment, as seen in FIG. 4, the adapter 2 is adjustable so that it can be adapted to fit pallet jacks of different dimensions. In one embodiment the S-shaped portions 4 and 6 and the transverse members 14 and 16 are 2 inch×⅜ inch steel bars or sheets. In this embodiment each of the upper portions 3 of S-shaped portions 4 and 6 is between about 6 inches and 8 inches in length and preferably about 7 inches in length and each of the lower portions 7 of S-shaped portions 4 and 6 is between about 4½ and 6¾ inches in length and preferably about 5¾ inches in length. The distance between S-shaped portions 4 and 6 is between about 22 inches and about 26 inches and preferably about 24 inches.

The preferred process for forming the S-shaped portions 4 and 6 and transverse members 14 and 16 is shearing two inch or suitable sized bars or strips from a sheet of ⅜ inch thick stainless steel and forming, by bending, the breaks defining the flange 8, lower portion 7 of the S-shaped portions 4 and 6, medial portions 5, and upper portions 3. Upper portion 3 is then heated and bent to form hook portion 10.

From the foregoing, it is seen that this invention is one well adapted to attain all the ends and objectives hereinabove set forth together with other advantages which are inherent in the structure. Variations of the present invention will suggest themselves to those skilled in the art in light of the above-detailed description. All such variations and modifications are within the full intended scope of the appended claims.

What is claimed is:

1. An adapter for a lift vehicle for enabling the lift vehicle to handle a four-way pallet by engaging notches formed in a four-way side of said pallet comprising:

at least two S-shaped portions;

at least one transverse member connecting said S-shaped portions;

means for attaching the adapter to the lift vehicle; and means for engaging the adapter to said notches of said four-way side of a pallet wherein the at least two S-shaped portions each further comprise an upper portion, a medial portion and a lower portion, wherein said upper portion and said lower portion are offset and substantially parallel and oriented in the same plane and said medial portion connects and is perpendicular to said upper portion and said lower portion, forming a first substantially right angle between said upper and said medial portions and forming a second substantially right angle between said medial and lower portions and wherein said transverse member further comprises a first end and a second end and a top edge and a bottom edge, wherein said first end is welded to one of the S-shaped portions at the second substantially right angle wherein said top edge of said transverse member is welded to said medial portion and said bottom edge is welded to said lower portion, and wherein said second end is welded to the other of the S-shaped portions at the second substantially right angle wherein said top edge of said transverse member is welded to said medial portion and said bottom edge is welded to said lower portion.

2. The adapter according to claim 1 wherein the means for attaching the adapter is a hook means disposed on said at least two S-shaped portions.

3. The adapter according to claim 1 wherein the means for engaging the adapter to the four-way side of a pallet is flange means disposed on said at least two S-shaped portions.

4. The adapter according to claim 1 further comprising a second transverse member connecting said S-shaped portions.

5. The adapter according to claim 1 wherein said adapter is fabricated from sheet stainless steel.

6. The adapter according to claim 1 wherein said adapter is adjustable to fit lift vehicles of different dimensions.

* * * * *